(12) United States Patent
Kuo et al.

(10) Patent No.: US 11,082,430 B1
(45) Date of Patent: Aug. 3, 2021

(54) DEVICE AUTHORIZATIONS USING CERTIFICATES AND SERVICE ACCESS POLICY TEMPLATES

(71) Applicant: Amazon Technologies, Inc., Seattle, WA (US)

(72) Inventors: Calvin Yue-Ren Kuo, Mercer Island, WA (US); Robert P. Cochran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 435 days.

(21) Appl. No.: 15/994,187

(22) Filed: May 31, 2018

(51) Int. Cl.
H04L 29/06 (2006.01)

(52) U.S. Cl.
CPC ........ *H04L 63/102* (2013.01); *H04L 63/0823* (2013.01); *H04L 63/105* (2013.01); *H04L 63/20* (2013.01)

(58) Field of Classification Search
CPC . H04L 63/0823; H04L 63/102; H04L 9/3263; H04L 9/3268; H04L 63/10; H04L 63/105; H04L 63/20; H04L 41/28; H04L 63/08; G06F 2221/2141; G06F 21/31; G06F 21/57; G06F 21/62
See application file for complete search history.

(56) References Cited

U.S. PATENT DOCUMENTS

| | | | | |
|---|---|---|---|---|
| 6,826,690 B1 * | 11/2004 | Hind | ........................ | G06F 21/31 713/173 |
| 7,059,516 B2 * | 6/2006 | Matsuyama | .............. | G07C 9/23 235/382 |
| 8,127,336 B2 * | 2/2012 | Bienek | ................ | H04L 41/5061 726/1 |
| 9,332,002 B1 * | 5/2016 | Bowen | ................ | H04L 63/0823 |
| 9,762,619 B1 * | 9/2017 | Vaidya | .................... | G06F 9/455 |
| 9,785,928 B1 * | 10/2017 | Brandwine | ......... | G06F 9/45533 |
| 10,148,495 B1 * | 12/2018 | Oczkowski | ............. | H04L 69/14 |
| 2002/0129024 A1 * | 9/2002 | Lee | ...................... | H04L 63/0815 |
| 2007/0043679 A1 * | 2/2007 | Le | ........................... | G06F 21/10 705/59 |
| 2007/0124812 A1 * | 5/2007 | Weeks | .................. | G06F 21/604 726/10 |
| 2007/0253553 A1 * | 11/2007 | Abdul Rahman | .... | G07F 7/1025 380/259 |

(Continued)

FOREIGN PATENT DOCUMENTS

WO  WO-2004021130 A2 *  3/2004  ............. G06Q 20/10

*Primary Examiner* — Farid Homayounmehr
*Assistant Examiner* — Lizbeth Torres-Diaz
(74) *Attorney, Agent, or Firm* — Davis Wright Tremaine LLP

(57) ABSTRACT

Technology is described for a device registration service for a local computing environment. The device registration service may provide one or more computing hubs within the local computing environment with robust means to authenticate or verify the authority of a computing device (e.g., a computer, a server, a mobile device, smart phone, a tablet), and/or other devices requesting to access to the local computing environment. The device registration service provided by the one or more computing hubs may be used in addition to, in place of, or as a backup to a device management and provisioning services provided remotely from the local computing environment using a service provider environment.

20 Claims, 8 Drawing Sheets

(56) References Cited

U.S. PATENT DOCUMENTS

| | | | | |
|---|---|---|---|---|
| 2008/0076419 A1* | 3/2008 | Khetawat | ............ | H04L 43/00 |
| | | | | 455/435.1 |
| 2010/0180124 A1* | 7/2010 | Morijiri | ............ | H04L 9/3231 |
| | | | | 713/176 |
| 2012/0072721 A1* | 3/2012 | Rescorla | ............ | H04L 63/0823 |
| | | | | 713/158 |
| 2014/0337617 A1* | 11/2014 | Murao | ............ | H04L 9/3263 |
| | | | | 713/156 |
| 2015/0113172 A1* | 4/2015 | Johnson | ............ | H04L 67/125 |
| | | | | 709/245 |
| 2015/0134826 A1* | 5/2015 | Shah | ............ | H04L 63/08 |
| | | | | 709/226 |
| 2015/0286951 A1* | 10/2015 | Rigdon | ............ | G06N 7/005 |
| | | | | 706/52 |
| 2017/0006030 A1* | 1/2017 | Krishnamoorthy | ... | H04L 9/3263 |
| 2017/0105171 A1* | 4/2017 | Srivastava | ............ | H04W 12/086 |
| 2017/0331834 A1* | 11/2017 | Malik | ............ | H04L 63/102 |
| 2018/0063194 A1* | 3/2018 | Vaidya | ............ | H04L 63/0263 |
| 2018/0288060 A1* | 10/2018 | Jackson | ............ | H04L 63/102 |
| 2019/0349426 A1* | 11/2019 | Smith | ............ | H04L 45/20 |
| 2021/0006599 A1* | 1/2021 | Newell | ............ | H04L 63/0815 |

* cited by examiner

US 11,082,430 B1

DEVICE AUTHORIZATIONS USING CERTIFICATES AND SERVICE ACCESS POLICY TEMPLATES

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy applications.

Advancements in communication technologies have allowed even relatively inexpensive electronic devices to communicate with other devices and computing systems over a computer network. For example, the Internet of Things (IoT) is the interconnection of computing devices scattered across the globe using the existing Internet infrastructure. Such devices may be able to capture data, and then the devices may securely communicate the data over a network to a centralized computing service in a service provider environment. In one example, the devices may send the data to a computing hub or computing node in a local wireless network, and the computing hub may forward the data received from the devices to the centralized service in the service provider environment.

Many times computing devices may be designed to process data content or applications, which may be desired to be secure. Moreover, computing devices may also be configured to access a secured computing system, such as a computing hub or service provider environment. Such computing systems, content, and/or applications may use security protocols, encryption, and other security features to communicate securely and access secure information. While the existing security and authentication protocols may be useful, current authentication protocols may be insufficient and inadequate to scale to meet the large demand for security authorization and authentication as computing functionality is increasingly used in mobile devices and devices that are part of the Internet of Things (IoT). Devices enabled with IoT functionality are expected to be numbered in the billions or trillions over the next few years and such devices are expected to use secure interfaces for communicating with networked resources.

DETAILED DESCRIPTION

Figure 1:
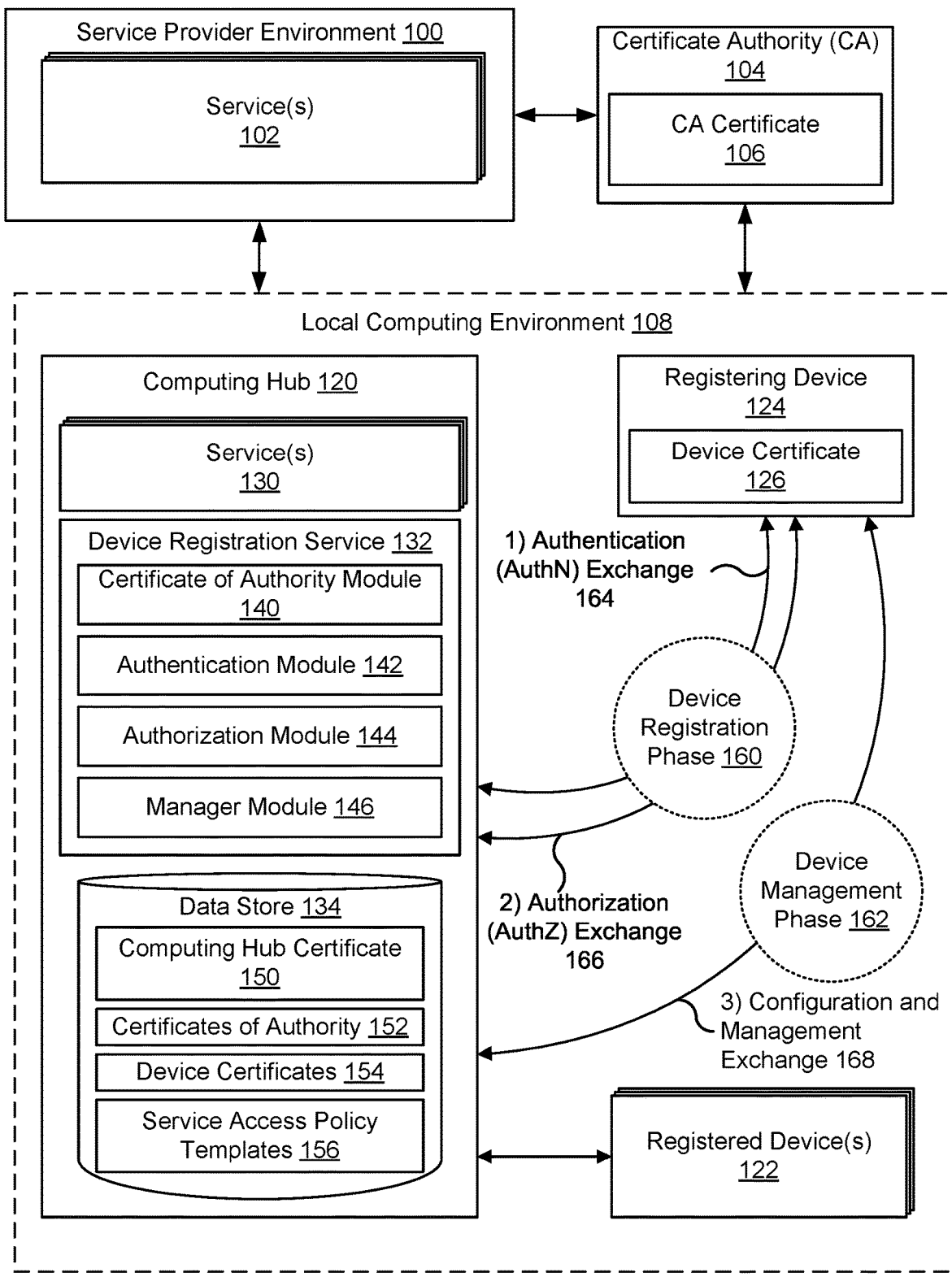
FIG. 1 illustrates a system and related operations that may implement a device registration service for deploying or provisioning devices within a computing environment using certificates associated with a service provider environment according to an example of the present technology.

A technology is described for a device registration service for a local computing environment. The device registration service may provide one or more computing hubs within the local computing environment with robust means to authenticate or verify the authority of a computing device (e.g., a computer, a server, a mobile device, smart phone, a tablet, a sensor device, a camera, etc.), and/or other devices requesting to access to the local computing environment. A device registration service provided by the one or more computing hubs may be used in addition to, in place of, or as a backup to authentication services provided separately from the local computing environment using a service provider environment.

A digital certificate may be used to authenticate and/or verify computers, or other digital devices that desire to access a local computing environment (e.g., a local computing environment managed by a customer of the service provider environment). A device may request to access or communicate within the local computing environment. The device may discover a computing hub advertising a device registration service. The computing hub and the device may mutually authenticate using certificates. For example, the certificates may have a common trust anchor, such as each certificate being signed by a group certificate authority (CA). In another example, the device's certificate may have been signed by an intermediate CA having a trust anchor recognized by the computing hub.

According to the present technology, the computing hub may determine a set of authorizations for the device using device identification information included in the device's certificate. In another example, the computing hub may determine a set of authorizations for the device using a number of levels in a change of trust hierarchy included in the device's certificate. Upon authenticating the device, the computing hub may determine what services the device is authorized to access. The computing hub may authorize the device with a scope of authorized communication. The scope of authorized communication may limit communication strictly between the computing hub and the device until further authorizations are established. The computing hub may expand the initial scope of authorized communication through increasingly permissive exchanges with the device. An authentication exchange may involve the device providing authorization information within the scope of authorized communication allowed under the exchange.

According to one example of the present technology, a computing hub may receive a certificate associated with a device requesting to access a local environment. The computing hub may authenticate the device using the certificate. The computing hub may authenticate the device using the certificate when the certificate is signed by a group CA. In another example, the computing hub may authenticate the device using the certificate when the certificate is signed by an intermediate CA recognized by the computing hub.

The computing hub may determine a set of authorizations for the device. The computing hub may determine the set of authorizations using the certificate. The computing hub may determine whether the certificate includes device identification information that authorizes the device to access the computing hub or the local environment. The computing hub may determine whether the certificate includes a trust anchor at or within a predetermined positioned in a chain of trust hierarchy that authorizes the device to access the computing hub or the local environment. The computing hub may authorize the device using the certificate with a first set of authorizations having a first scope of authorized communication between the device and the computing hub. For example, even though the computing hub authenticates the device using the certificate, the computing hub may set a default set of authorizations for the device as the first set of authorizations when the computing hub does not have specific authorization information corresponding to the device identification information. In another example, the computing hub may retrieve or construct the set of authorizations for the device using authorization information corresponding to the device identification information.

The computing hub may enable access using the set of authorizations. The computing hub may enable the device to communicate with the computing hub using the first scope of authorized communication enabled. The computing hub may restrict or disable communication outside of the first scope of authorized communication. In one example, the computing hub may restrict communication to a specific address, protocol, function, service, etc. The computing hub may expand the set of authorizations of the device with a second set of authorizations. The computing hub may expand the first set of authorizations using authorization information provided by the device during communicating within the first scope of authorized communication. The expanded set of authorizations may provide additional access. The computing hub may enable access to additional addresses, protocols, functions, services, devices, etc.

The computing hub may perform dynamic policy construction (e.g., on-the-fly) using service access policy templates. In one example, the computing hub may perform dynamic policy construction using the service access policy templates and information associated with the device's certificate. The computing hub may determine device identification information associated with the certificate, for example, by extracting the device identification information from the certificate. The computing hub may determine that the certificate authorizes the device to access defined services in the local environment when the device identification information is authorized by a service access policy template. The service access policy template may include one or more substitution variables that each correspond to a portion of a certificate, and the portion of the certificate can be used to define the substitution variables in the service access policy template. For example, the computing hub may construct a set of authorizations (e.g., the first set of authorizations) for the device using the service access policy template by substituting the corresponding portions of the device's certificate with the substitution variables in the service access policy template.

In a further example, the computing hub may determine a chain of trust hierarchy associated with the certificate. The computing hub may determine the number of levels in the chain of trust hierarchy before which the certificate includes a recognized trust anchor. The computing hub may authorize different levels of access to defined services in the local environment (e.g., using service access policy templates) according to the number of levels in the chain of trust hierarchy before which the certificate includes the recognized trust anchor.

In yet another example, the computing hub may perform dynamic policy construction using the service access policy templates and authentication information provided by (or on behalf of) the device. The computing hub may receive authorization information from the device in response to the computing hub and the device communicating using the first scope of authorized communication enabled by the device's certificate. The computing hub may determine that the authorization information authorizes the device to access defined services in the local environment when the authorization information is authorized by a service access policy template. For example, the authorization information may include user credentials, a one-time pad (OTP), an encrypted nonce, etc. that map to the service access policy template. The computing hub may construct a set of authorizations (e.g., the second set of authorizations) for the device using the service access policy template by substituting the authorization information provided by the device with the substitution variables in the service access policy template.

In yet another example, the computing hub may perform device configuration and management using the service access policy templates and data generated by the device. The computing hub may receive data observed by the device about the local environment, such as environment data (e.g., temperature, humidity, light levels, etc.) and captured data (e.g., images and video). The computing hub may construct a set of authorizations (e.g., the second set of authorizations) for the device by analyzing the data provided by the device and using the service access policy templates. The computing hub may determine configuration information for the device using the data observed by the device about the local environment. For example, the computing hub may determine the type of the device or the role of the device using the data. In another example, the computing hub may determine the location of the device using the data. The computing hub may configure the device within the local environment using the determined configuration information. The computing hub may authorize the device with a set of authorizations defined according to the configuration information. In another example, the computing hub may determine a role for the device based at least in part on the data observed by the device about the local environment. The computing hub may configure the device within the local environment using the determined role.

According to the present technology, the computing hub may perform dynamic policy construction (e.g., on-the-fly) using service access policy templates. The computing hub may authorize the device with an initial or default set of authorizations constructed using the service access policy templates and the device's certificate. The computing hub may authorize the device with a full or final set of authorizations constructed using the service access policy templates and the device's certificate and additional authentication information provided by (or on behalf of) the device. The computing hub may construct the full or final set of authorizations using successively expanding scopes of authorized communication between the computing hub and the device.

FIG. 1—Device Registration Service

FIG. 1 illustrates a system and related operations that may implement a device registration service for deploying or provisioning devices within a local computing environment using certificates associated with a service provider environment according to an example of the present technology. The device registration service can provide deployment and/or provisioning services to devices within a local computing environment. For example, the local computing environment may include interconnection of computing devices using a variety of networking infrastructures, including the Internet. Such devices may be able to capture data and then the devices may process the data locally or securely communicate the data over a network to a centralized computing service in a service provider environment. Alternatively, the devices may send the data to a computing hub or computing node in a local network, and the computing hub may forward the data received from the devices in a raw form or processed form (e.g., summarized) to the centralized service in the service provider environment.

The service provider environment may allow a customer to manage both the local computing environment and any of the services utilized in the service provider environment. The customer may deploy and/or provision devices within the local computing environment using control plane application programming interfaces (APIs) of the service provider environment. However, this security infrastructure may need the configuration to be deployed to the device and/or computing hub before the device can be authenticated to connect within the local computing environment. Additionally, any access policies within the local computing network may need updates before the device is authorized to access services within the local computing environment. According to one example of the present technology, the device registration service may provide authentication/authorization (AuthN/AuthZ) to a device that might otherwise be prevented from accessing the local computing environment, for example, when the device or the computing hub are offline (not connected to the internet) and not able to process a deployment and/or provisioning request through the service provider environment.

FIG. 1 illustrates example components of the present technology at various stages of communication with a service provider environment 100. The service provider environment 100 may include one or more computing systems providing one or more service(s) 102. The service provider environment 100 may provide virtualized computing services (i.e., virtualized computing, virtualized storage, virtualized networking, etc.) to customers and their devices, such as devices included in the local computing environment 108. More specifically, the service provider environment 100 may provide virtualized computing, virtualized storage, virtualized networking, and other virtualized services that are executing on a hardware substrate. Some examples of the service(s) 102 may include computing services, platform as a service, software as a service, storage as a service, on-demand applications, and services for managing local computing environments.

As illustrated, the service provider environment 100 may be in communication with a Certificate Authority (CA) 104 having a CA certificate. The service provider environment 100 may also be in communication with a local computing environment 108. In addition, the CA 104 may be in communication with the local computing environment 108. For example, the service provider environment 100, the CA 104, and the local computing environment 108 may be with and/or in communication with each other, by one or more communication methods, such as by the Internet or a wide area network (WAN).

In one example, the service provider environment 100 and the CA 104 may be controlled by the same owner or entity. In another example, the CA 104 may be a certificate authority that is completely independent of the service provider environment 100 or a customer of the owner of the service provider environment 100. In one aspect, the CA 104 may include a CA certificate 106. The CA certificate 106 may be owned by, signed by, or registered with the service provider environment 100. The CA certificate 106 may be a root certificate. The CA certificate 106 may issue multiple certificates in the form of a tree structure. The root certificate is the top-most certificate of the tree, the private key of which is used to "sign" other certificates. The certificates immediately below the root certificate inherit the trustworthiness of the root certificate. Certificates further down the tree also depend on the trustworthiness of the intermediates, often known as subordinate certificate authorities (CAs).

The local computing environment 108 may include a computing hub 120, one or more registered device(s) 122, and a registering device 124 having a device certificate 126. The local computing environment 108 may include a physical or logical aggregation of one or more computing hubs, connected devices, and networks. A physical aggregation may include one or more individual computing systems that include physical resources, such as a processor device, a memory device, a storage device, a network card, and the like. A logical aggregation may include one or more computer systems that include shared or partitioned logical resources, such as computing services, memory services, storage services, network services, and the like. The local computing environment 108 may aggregate the computing hub 120 with other computing hubs to form a computing hub group.

The computing hub 120 may include one or more hardware and/or software elements for providing one or more services to the registered device(s) 122. The computing hub 120 may include, for example, processor-based systems. As illustrated in FIG. 1, the computing hub 120 may include one or more service(s) 130, a device registration service 132, and a data store 134. The device registration service 132 may include a certificate of authority module 140, an authentication module 142, and authorization module 144, and a manager module 146. The data store 134 may include a computing hub certificate 150, certificates of authority 152, device certificates 154, and service access policy templates 156.

The computing hub 120 may provide the service(s) 130 to the registered device(s) 122. The computing hub group may provide services locally to the registered device(s) 122 and/or provide access to the service(s) 102 of the service provider environment. Some examples of services provided by the computing hub 120 may include communication services, data processing services, code execution services, device monitoring services, device management services, device configuration services, device registration services, and the like. For example, the computing hub 120 may provide communication services (e.g., messaging services) between the registered device(s) 122 and the service provider environment 100. The computing hub 120 may forward data generated by the registered device(s) 122 to the service(s) 102 for collection, aggregation, formatting, processing, storage, and the like. In another example, the computing hub 120 may provide local data processing and data aggregation services for the data generated by the registered device(s) 122.

The device registration service 132 may one or more hardware and/or software elements for providing device deployment and/or provisioning services. The device registration service 132 may provide authentication/authorization (AuthN/AuthZ) to a device (e.g., the registering device 124) in order for the device to access or communicate within the local computing environment 108. For example, in some situations, a deployment and/or provisioning request by the registering device 124 may not be able to be processed through the service provider environment 100. Thus, the device registration service 132 enables a customer of the service provider environment 100 to enable access to the local computing environment 108, for example, when the registering device 124 or the computing hub 120 are not connected to the Internet and not able to process a deployment and/or provisioning requests through the service provider environment 100.

The certificate of authority module 140 may include one or more hardware and/or software elements for providing certificate of authority services. The certificate of authority module 140 may manage the access, storage, and retrieval of the certificates of authority 152 located in data store 134. The certificate of authority module 140 may receive one or more of the certificates of authority 152 from the CA 104, the service provider environment 100, third parties, etc. The certificate of authority module 140 may provide management of root, intermediate, group, user certificates, and the like.

The authentication module 142 may include one or more hardware and/or software elements for providing authentication services. The authentication module 142 may use cryptographic authentication techniques to verify the identity of a device. For example, the authentication module 142 may authenticate one or more of the registered device(s) 122 using device certificates 154. The authentication module 142 may determine whether one or more of the device certificates 154 can be authenticated using one or more of the certificates of authority 154 maintained by the certificate of authority module 140. The authentication module 142 may determine that a device certificate is valid when the device certificate includes a recognized trust anchor in a chain of trust presented in the device certificate.

The authorization module 144 may include one or more hardware and/or software elements for providing authorization services. The authorization module 144 may determine a set of authorizations associated with a device which may enable access to services on the computing hub or within the local computing environment 108. For example, the authorization module 144 may determine the set of authorizations using one or more service access policies. A service access policy may specify what services (e.g., hardware, software, local services) a device is authorized to access. A service access policy may specify how a device is authorized to access a resource, and a service access policy may specify when a device is authorized to access a resource. A service access policy template may be defined using a JSON document, an XML document, and the like.

According to one example of the present technology, the authorization module 144 may determine the set of authorizations using one or more service access policy templates 156. A service access policy template 156 enables a customer of the service provider environment 100 to dynamically set service access policies within the local computing environment 108. A service access policy template may include substitution variables so that the resulting service access policy works for many entities without having to make a unique copy of the policy for each entity. A service access policy template 156 may use one or more policy variables. A policy variable specifies a placeholder in a policy. When the policy is evaluated, the policy variable may be replaced with values that come from a particular context. For example, a policy variable "${Certificate.CommonName}" may represent a CommonName attribute in the device certificate 126. The CommonName attribute in the device certificate 126 may be extracted and substituted into the policy replacing the policy variable.

Each service access policy template may include a set of policy statements. A policy statement may identify a permission clause, an action clause, and a resource clause. The permission clause may specify one or more permissions (e.g., an access level) assigned to the action clause. For example, the permission clause may specify whether an action in the action clause will be allowed or denied. The action clause may specify an action to which the policy statement is directed. Some examples of actions that may be identified in the action clause are Message Queuing Telemetry Transport (MQTT) actions (e.g., connect, publish, receive, subscribe, etc.), device state actions (e.g., create, read, update, delete), execution state actions (e.g., create, read, update, delete, start, stop, etc.), and the like. The resource clause may specify the resource or resources to which the action applies. Some examples of resources that may be identified in the resource clause are a hardware resource, a software resource, an application, a service, a topic in a publish-subscribe network, and the like.

The manager module 146 may include one or more hardware and/or software elements for managing device registrations. The manager module 146 may coordinate the activities of the authentication module 142 and the authorization module 144. For example, during a device registration phase 160, the manager module 146 may coordinate the related authentication and authorization operations between the computing hub 120 and the registering device 124. The manager module 146 may instruct the authentication module 142 to perform one or more authentication processes for the registering device 124. The manager module 146 may instruct the authorization module 144 to perform one or more authorization processes for the registering device 124. In another example, during a device management phase 162, the manager module 146 may coordinate the related configuration and management operations between the computing hub 120 and the registering device 124. The manager module 146 may determine configuration information for the registering device 124. The manager module 146 may configure the registering device 124 using the determine configuration information, or the manager module 146 may manage power access and utilization, resource allocation and utilization, network access, etc., of the registering device 124.

In an authentication (AuthN) exchange 164 operation, the manager module 146 may participate in a mutual authentication with the registering device 124. The registering device 124 may authenticate the computing hub 120 using the computing hub certificate 150. The manager module 146 may have the authentication module 142 authenticate the registering device 124 using the device certificate 126. In the authentication (AuthN) exchange 164 operation, the manager module 146 may determine that the device certificate 126 associated with the registering device 124 has been signed by a group CA. The group CA may also have signed the computing hub certificate 150. The manager module 146 may determine that the common trust anchor, namely the group CA, authenticates the registering device 124. In another example, the manager module 146 may determine that the device certificate 126 associated with the registering device 124 has been signed by an intermediate CA. The intermediate CA may have been issued by one or more of the certificates of authority 152 in the data store 134. The manager module 146 may determine that a recognized trust anchor, namely one or more of issuers of the certificates of authority 152, authenticates the registering device 124.

In an authorization (AuthZ) exchange 166 operation, the manager module 146 may participate in an authorization negotiation with the registering device 124. In one example, the manager module 146 may determine an initial set of authorizations using the device certificate 126 and the service access policy templates 156. The manager module 146 may have the authorization module 144 determine whether device identification information extracted from or associated with the device certificate 126 applies to the service access policy templates 156. The manager module 146 may construct a set of authorizations using the device identification information and the service access policy templates 156. For example, the manager module 146 may construct the set of authorizations for the registering device 124 using the service access policy templates 154 by substituting values associated with the device identification information in place of one or more substitution variables of the service access policy templates 156.

In another example, the manager module 146 may have the authorization module 144 determine whether a number of levels in a chain of trust hierarchy before which the device certificate 126 includes a recognized trust anchor applies to the service access policy templates 156. The manager module 146 may construct a set of authorizations using the number of levels in a chain of trust hierarchy before which the device certificate 126 includes the recognized trust anchor and the service access policy templates 156. For example, the manager module 146 may construct the set of authorizations for the registering device 124 using the service access policy templates 154 by substituting the number of levels in a chain of trust hierarchy before which the device certificate 126 includes a recognized trust anchor in place of one or more substitution variables of the service access policy templates 156.

In the authorization (AuthZ) exchange 166 operation, the manager module 146 may further negotiate to expand the initial set of authorizations constructed using the device certificate 126. The manager module 146 may use authentication information provided by (or on behalf of) the registering device 124. The manager module 146 may expand the initial set of authorizations for the registering device 124 using the service access policy templates 154 by substituting values associated with the authorization information provided by (or on behalf of) the registering device 124 in place of one or more substitution variables of the service access policy templates 156. The manager module 146 may analyze or perform processing on the authorization information to determine the substitution values that will replace the substitution variables of the service access policy templates 156.

The manager module 146 may receive the authorization information as data generated by the registering device 124. The generated data may include sensor data observed about the local computing environment 108. For example, the manager module 146 may receive temperature data, tracking data, image data, connection data, etc. The manager module 146 may analyze or perform processing on the sensor data generated by the registering device 124 to determine the substitution values that will replace the substitution variables of the service access policy templates 156.

The computing hub 120 and the registering device 124 may repeatedly engage in the authorization (AuthZ) exchange 166 operation to negotiate using successively expanding scopes of authorized communication between the computing hub 120 and the registering device 124. According to one example of the present technology, the manager module 146 may authorize the registering device 124 with an initial (or default) set of authorizations enabled using the device certificate 126. The computing hub 120 and the registering device 124 may communicate using a scope of authorized communication specified by the initial set of authorizations. According to another example of the present technology, the manager module 146 may authorize the registering device 124 with an expanded set of authorizations enabled using subsequently communicated authenticating information provided by (or on behalf of) the registering device 124. For example, the manager module 146 may expand the authorization of the registering device 124 from a previous scope to individually or incrementally access one or more of a credential authorization process, a challenge-response authorization process, a one-time pad (OTP) authorization process, a cryptograph authorization process, and the like. The manager module 146 may determine a new scope of authorization for the registering device 124 using the results of the credential authorization process, the challenge-response authorization process, the one-time pad (OTP) authorization process, the cryptograph authorization process, and the like. The manager module 146 may determine the substitution values that will replace the substitution variables of the service access policy templates 156 using the results of the credential authorization process, the challenge-response authorization process, the one-time pad (OTP) authorization process, the cryptograph authorization process, and the like.

In a configuration and management exchange 168 operation, the manager module 146 may provide configuration and management of the registering device 124. The manager module 146 may determine an initial configuration for the registering device 124 using the device certificate 126. The initial configuration may specify a set of authorizations for the registering device 124. The manager module 146 may configure the registering device 124 within the local computing environment 108 using the initial configuration. The manager module 146 may directly or indirectly configure the registering device 124 using the initial configuration. For example, the manager module 146 may assign the registering device a new network address, a hardware configuration, a software configuration, etc. The manager module 146 may configure a network infrastructure, such as layer 2 or 3 configurations, subnets, routing tables, packet filters and priorities, and the like. The manager module 146 may enable access to or from the registering device 124 with respect to other hardware and/or software resources within the local computing environment 108.

In another example, the manager module 146 may determine an initial role for the registering device 124 using the device certificate 126. The initial role may specify a set of authorizations for the registering device 124. The manager module 146 may configure the registering device 124 within the local computing environment 108 using the initial role. Some examples of roles associated with the registering device 124 may include a data generating role, a data consuming role, a functional role (such as a network router, switch, gateway), a device-type role (such as a camera, a thermometer, a specific-purposes sensor), and the like.

The computing hub 120 and the registering device 124 may repeatedly engage in the configuration and management exchange 168 operation. The manager module 146 may determine configuration information for the registering device 124 using subsequently communicated authenticating information provided by (or on behalf of) the registering device 124. The determined configuration information may specify a set of authorizations for the registering device 124. The manager module 146 may configure the registering device 124 within the local computing environment 108 using the configuration information. In another example, the manager module 146 may determine one or more roles for the registering device 124 using subsequently communicated authenticating information provided by (or on behalf of) the registering device 124.

According to the present technology, the computing hub 120 may authenticate and authorize the registering device 124 to access the local computing environment 108 as one of the registered device(s) 122. The computing hub 120 may dynamically construct access policies for the registering device 124 using the service access policy templates 156. The computing hub 120 may secure access by the registering device 124 to the computing hub 120 or the local computing environment 108 without prior deployment or provisioning by the service provider environment 100. According to the present technology, the computing hub 120 may configure and manage the registering device 124 within the local computing environment 108 throughout the lifecycle of the registering device 124 within the local computing environment 108.

Figure 2:
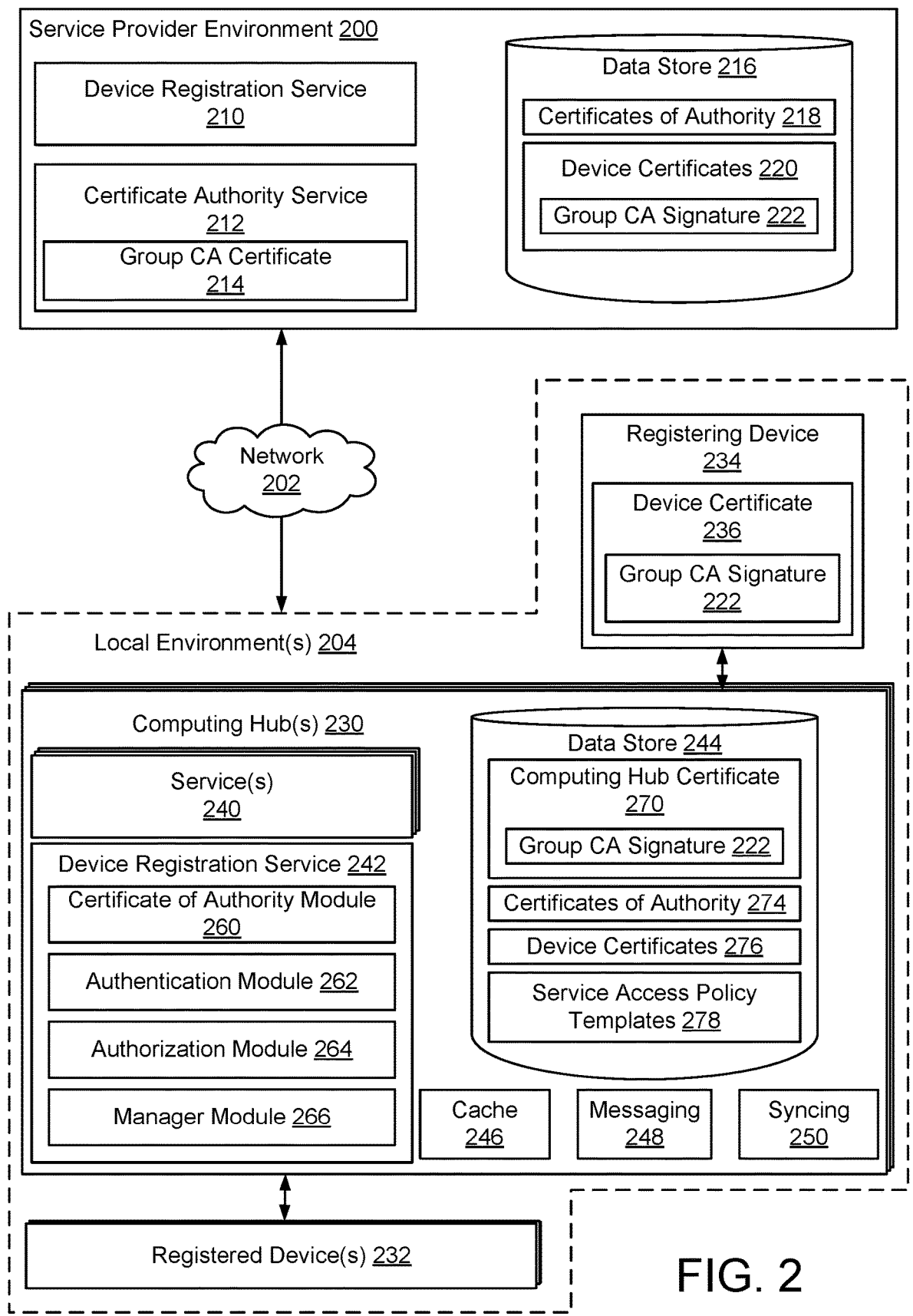
FIG. 2 illustrates a system and related operations that may implement a device registration service for deploying or provisioning devices within local environment(s) using group certificate authority (CA) certificates according to an example of the present technology.

FIG. 2—Device Registration Service Using Group CA

FIG. 2 illustrates a system and related operations that may implement a device registration service for deploying and/or provisioning devices within local environment(s) using group certificate authority (CA) certificates according to an example of the present technology. One example of the service provider environment 200 includes virtualized computing services providing on-demand computing and storage resources. The service provider environment 200 may include one or more server computers hosting one or more services. As illustrated, the service provider environment 200 may include a device registration service 210, a certificate authority service 212 having a group CA certificate 214, and a data store 216 having one or more certificates of authority 218 and device certificates 220. Each of the device certificates may include a group CA signature 222.

The service provider environment 200 may utilize a network 202 to communicate with one or more local environment(s) 204. The local environment(s) 204 may include one or more computing hub(s) 230, one or more registered device(s) 232, and a registering device 234. The computing hub(s) 230 may include one or more service(s) 240, a device registration service 242, a data store 244, a cache service 246, a messaging service 248, and a syncing service 250. The device registration service 242 may include a certificate of authority module 260, an authentication module 262, and authorization module 264, and a manager module 266. The data store 244 may include a computing hub certificate 270, one or more certificates of authority 274, one or more device certificates 276, and one or more service access policy templates 278. The computing hub certificate 270 may include the group CA signature 222.

The service provider environment 200 may utilize the device registration service 210 to provision IoT devices within the local environment(s) 204. Device's having a device certificate issued by the service provider environment 200 with the group CA signature 222 may be authenticated in order to join one of the local environment(s) 204. For example, the service provider environment 200 may send authentication data to the local environment(s) 204 where a first computing hub 230 and the registering device 234 may mutually authenticate using the computing hub certificate 270 and the device certificate 236 respectively received from the service provider environment 200 because each includes the group CA signature 222.

According to the present technology, the computing hub(s) 230 may perform device registrations using the device registration service 242 when the service provider environment 200 is unavailable. After one of the computing hub(s) 230 and the registering device 234 mutually authenticate using the computing hub certificate 270 and the device certificate 236, the computing hub 230 may determine whether the device certificate 236 includes device identification information that applies to the service access policy templates 278. According to another example of the present technology, after one of the computing hub(s) 230 and the registering device 234 mutually authenticate using the computing hub certificate 270 and the device certificate 236, the computing hub 230 may determine whether a number of levels in a chain of trust hierarchy before which the device certificate 236 includes a recognized trust anchor that applies to the service access policy templates 278. According to a further example of the present technology, the computing hub 230 may negotiate with the registering device 234 for a set of authorizations as discussed above.

Referring again to FIG. 2, in one configuration, the computing hub(s) 230 may utilize the cache service 246 for storing device reporting data or state data from the registered device(s) 232, for example, while the service provider environment 200 is inaccessible. When the service provider environment 200 becomes accessible again, the device data or state data may be uploaded from the cache service 246 to the service provider environment 200. In another example, the computing hub(s) 230 may utilize the messaging service 248 for providing messaging between the computing hub(s) 230 and the registered device(s) 232. In yet another example, the computing hub(s) 230 may utilize the syncing service 250 for syncing data and device states from the registered device(s) 232 to shadow device states in the service provider environment 200. More specifically, the computing hub(s) 230 may cache the state of the registered device(s) 232, using a virtual version, or "shadow," of each device 232, which tracks the device's current versus a desired state. These localized shadow states may be synchronized with shadow states in the service provider environment 200.

The registered device(s) 232 may be, for example, processor-based systems or embedded systems. The registered device(s) 232 may include, but are not limited to, a desktop computer, laptop or notebook computer, tablet computer, handheld computer, workstation, network computer, or other devices with like capability. In another example, the registered device(s) 232 may include IoT devices. As non-limiting examples, the registered device(s) 232 may include consumer products (e.g., rice cookers, televisions, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 202. Commercial devices may also be included in the definition of the registered device(s) 232, including: commercial printing presses, commercial freezers, commercial kilns, commercial mixers or other commercial equipment. The registered device(s) 232 may be other types of embedded devices that provide electronic controls for a machine or system.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object-oriented databases, cluster storage systems, data storage devices, data warehouses, flat files and data storage configuration in any centralized, distributed, or clustered environment. The storage system components of the data store may include storage systems such as a SAN (Storage Area Network), a virtualized storage network, volatile or non-volatile RAM, optical media, or hard-drive type media. The data store may be representative of a plurality of data stores as can be appreciated.

The network 202 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
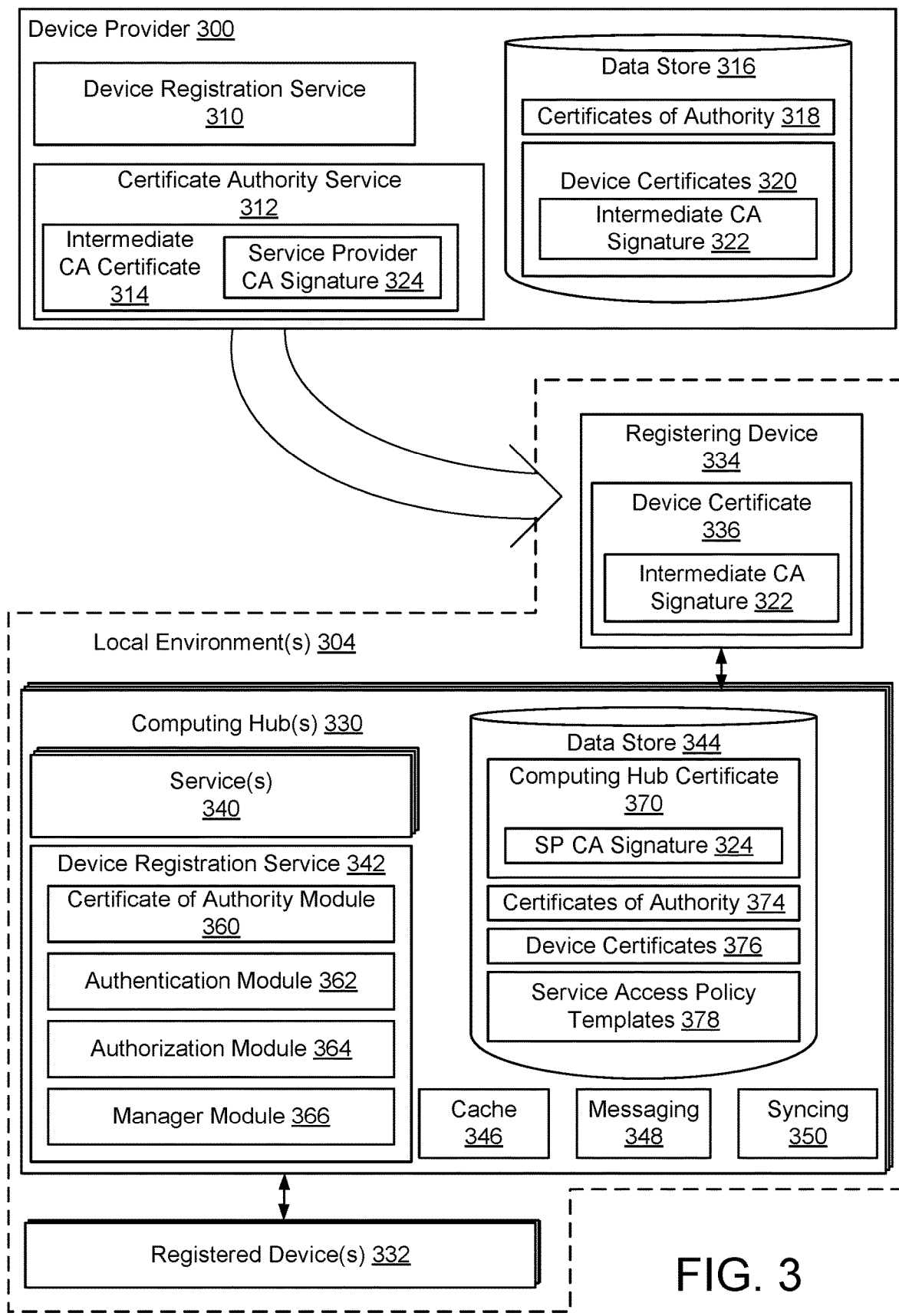
FIG. 3 illustrates a system and related operations that may implement a device registration service for deploying or provisioning devices within local environment(s) using intermediate certificate authority (CA) certificates associated with a device provider according to an example of the present technology.

FIG. 3—Device Registration Service Using Intermediate CA

FIG. 3 illustrates a system and related operations that may implement a device registration service for deploying and/or provisioning devices within local environment(s) using intermediate certificate authority (CA) certificates associated with a device provider according to an example of the present technology. One example of the device provider 300 includes a manufacturer which provides IoT devices. The device provider 300 may include manufacturing and shipping facilities. As illustrated, the device provider 300 may include a device registration service 310, a certificate authority service 312 having an intermediate CA certificate 314, and a data store 316 having one or more certificates of authority 318 and device certificates 320. Each of the device certificates may include an intermediate CA signature 322. The intermediate CA certificate 314 may include a service provider CA signature 324.

The device provider 300 may manufacture devices compatible for use within one or more local environment(s) 304. The local environment(s) 304 may include one or more computing hub(s) 330, one or more registered device(s) 332, and a registering device 334. The computing hub(s) 330 may include one or more service(s) 340, such as: a device registration service 342, a data store 344, a cache service 346, a messaging service 348, and a syncing service 350. The device registration service 342 may include a certificate of authority module 360, an authentication module 362, and authorization module 364, and a manager module 366. The data store 344 may include a computing hub certificate 370, one or more certificates of authority 374, one or more device certificates 376, and one or more service access policy templates 378. The computing hub certificate 370 may include the service provider CA signature 324.

The device provider 300 may utilize the device registration service 310 to provision IoT devices for use within the local environment(s) 304. Device's having a device certificate issued by the device provider 300 with the intermediate CA signature 322 may be authenticated to join one of the local environment(s) 304. For example, one of the computing hub(s) 330 and the registering device 334 may mutually authenticate using the computing hub certificate 370 and the device certificate 336 because each includes a recognized trust anchor, namely, the service provider CA signature 324. The service provider CA signature 324 may be a root CA or an intermediate CA issued directly or indirectly by the root CA.

According to the present technology, the computing hub(s) 330 may perform device registrations using the device registration service 342. After the computing hub 330 and the registering device 334 mutually authenticate using the computing hub certificate 370 and the device certificate 336, the computing hub 330 may determine whether the device certificate 336 includes device identification information that applies to the service access policy templates 378. The computing hub 330 may construct a set of authorizations using the service access policy templates 378 and the device identification information from the device certificate 336. According to another example of the present technology, after one of the computing hub(s) 230 and the registering device 234 mutually authenticate using the computing hub certificate 270 and the device certificate 236, the computing hub 230 may determine whether a number of levels in a chain of trust hierarchy before which the device certificate 236 includes a recognized trust anchor that applies to the service access policy templates 278. According to a further example of the present technology, the computing hub 330 may negotiate with the registering device 334 for a set of authorizations using authorization information provided by (or on behalf of) the registering device 334.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
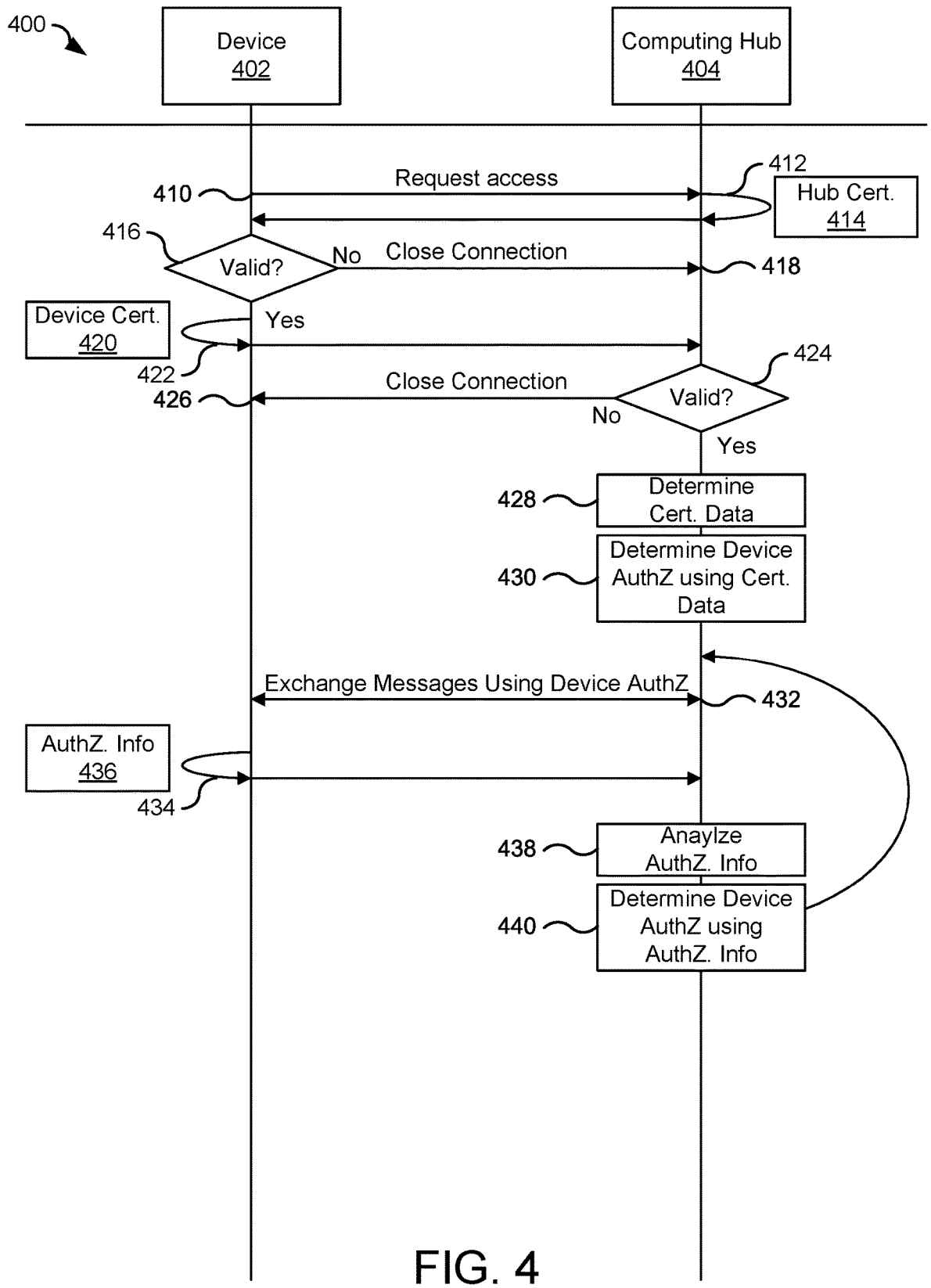
FIG. 4 illustrates a system for out-of-band device registration of a device with a computing hub in a local network according to an example of the present technology.

FIG. 4—Out-of-Band Device Registration

FIG. 4 illustrates a system 400 for out-of-band registration of a device 402 with a computing hub 404 in a local network according to an example of the present technology. In operation 410, the device 402 may request access. For example, the device 402 may request access to the computing hub 404. In addition, the device 402 may request access to other devices that connect to the computing hub 404, and the device 402 may request access to communicate within the local network. The device 402 may also request access to communicate outside of the local network, for example, through the computing hub 404 or through another device.

In one example, the device 402 may request access to the one or more services provided by the computing hub 404. The device 402 may also request access to a configuration service that provides configuration information from the computing hub 404, such as hardware-level configurations, software-level configurations, and the like. The device 402 may further request access to a management service that provides management instructions from the computing hub 404. In addition, the device 402 may request access to a publish-subscribe system that includes the computing hub 404.

In another example, the device 402 may request access to one or more services provided by a service provider environment accessible through the computing hub 404. The device 402 may request access to a storage service that provides storage of data generated by the device 402. The device 402 may request access to a code execution service that provides data processing using code snippets. In yet another example, the device 402 may request access a device shadow service that maintains a shadow state of the device 402.

The device 402 may request access using one or more protocols between the device 402 and the computing hub 404. The device 402 may request access using a handshake protocol or secure communications protocol, such as Transport Layer Security (TLS) in a communication between the device 402 and the computing hub 404. The device 402 may request access in a communication between the device 402 and the computing hub 404 by presenting one or more device certificates (e.g., device certificate 420). Some examples of protocols that may be used may include wired protocols and wireless protocols (e.g., Z-Wave and Zigbee).

In operation 412, the computing hub 404 may receive the request from the device 402. The computing hub 404 may issue a response to the access request from the device 402. For instance, the computing hub 404 may respond with a digital certificate, such as a computing hub certificate 414. The computing hub certificate 414 may include information about the computing hub 404. The computing hub certificate 414 may include a subject identifying the computing hub 404 and information about the issuer of the computing hub certificate 414. The computing hub certificate 414 may include an X.509 digital certificate.

In operation 416, the device 402 may receive the computing hub certificate 414 from the computing hub 404. The device 402 may determine whether the computing hub certificate 414 is valid. The device 402 may determine that the computing hub certificate 414 is valid when the computing hub certificate 414 has been issued directly or indirectly by a trusted certificate authority. The device 402 may determine that the computing hub certificate 414 includes a chain of trust having a recognized trust anchor. In one example, the device 402 may determine that the computing hub certificate 414 has been issued by a group CA. The group CA may also have issued one or more certificates associated with the device 402. In another example, the device 402 may determine that the computing hub certificate 414 has been issued directly or indirectly by a root CA. The root CA may have issued one or more certificates to an intermediate CA involved in the issuance of the one or more certificates associated with the device 402.

The device 402 may close the connection in operation 418 when the device 402 determines that the computing hub certificate 414 associated with the computing hub 404 is not valid in operation 416. When the device 402 determines that the computing hub certificate 414 associated with the computing hub 404 is valid, in operation 416, the device 402 may reply as in operation 422. The device 402 may reply with a digital certificate, such as a device certificate 420. The device certificate 420 may include information about the device 402. The device certificate 420 may include a subject identifying the device 402 and information about the issuer of the device certificate 420. The device certificate 420 may include an X.509 digital certificate.

In operation 424, the computing hub 404 may receive the digital certificate 420 associated with the device 402. In operation 424, the computing hub 404 may determine whether the device certificate 420 associated with the device 402 is valid. The computing hub 404 may determine that the device certificate 420 is valid when the device certificate 420 is signed by a trusted certificate authority. The computing hub 404 may determine that the device certificate 420 associated with the device 402 includes a chain of trust having a recognized trust anchor. In one example, the computing hub 404 may determine that the device certificate 420 associated with the device 402 is signed by a group CA that also signed the computing hub certificate 414 associated with the computing hub 404. Alternatively, the computing hub 404 may determine that the device certificate 420 associated with the device 402 is signed by an intermediate CA, where the intermediate CA has been issued one or more certificates by a root CA involved in the issuance of the computing hub certificate 414 associated with the computing hub 404.

The computing hub 404 may close the connection with the device 402, in operation 426, when the computing hub 404 determines that the device certificate 420 associated with the device 402 is not valid in operation 424. When the computing hub 404 determines that the device certificate 420 associated with the device 402 is valid in operation 424, the computing hub 404 may proceed to determine a set of authorizations applicable to the device 402.

According to the present technology, the device 402 and the computing hub 404 may mutually authenticate each other using the computing hub certificate 414 and the device certificate 420 during an authentication phase. The computing hub certificate 414 and the device certificate 420 may include a trust chain by which other devices can verify the authenticity of the certificate holder. The device 402 and the computing hub 404 may mutually authenticate in order to proceed to an authorization phase. The computing hub certificate 414 and the device certificate 420 may also include certificate attributes by which other devices can verify the authority of the certificate holder. For example, the device certificate 420 may include a Common Name attribute that computing hub 404 may use to determine a set of authorizations associated with the device 402 using service access policy templates. The device certificate 420 may also be used to bootstrap progressively permissive exchanges between the device 402 and the computing hub 404 in order to establish levels of access applicable to or requested by the device 402 as discussed further below.

In operation 428, the computing hub 404 may determine certificate information associated with the device certificate 420 that is associated with the device 402. The computing hub 404 may extract one or more fields, blocks, or portions from the device certificate 420. The computing hub 404 may determine identification information associated with the device 402 as the certificate information from the device certificate 420. In one example, the computing hub 404 may obtain the subject of the device certificate 420. A subject may indicate an entity to which the certificate belongs, such as a machine, an individual, or an organization. A subject may include a distinguished name (DN) defined using one or more attribute types, such as an email address (MAIL/E), a user identifier (UID or USERID), a common name (CN), a title (T), and organizational unit name (OU), a domain component (DC), an organization name (O), a host name (UNSTRUCTUREDNAME), and IP address (UNSTRUCTUREDADDRES), a distinguished name qualifier (DNQ), and the like. The computing hub 404 may use the subject of the device certificate 420 to determine an entity identifier, such as a serial number, common name, organization name, etc., associated with the device 402.

In another example, the computing hub 404 may analyze a chain of trust associated with the device 402 from the device certificate 420 to determine the certificate information. A trust anchor for the device certificate 420 may include a root certificate authority (CA) or one or more intermediate certificate authorities (CAs). A certificate hierarchy may include a structure in the device certificate 420 that allows the computing device 404 to verify the validity of the issuer of the device certificate 420. The device certificate 420 may be issued and signed by certificates that reside at various levels in a certificate hierarchy. The computing hub 404 may determine the validity and trustworthiness of the device certificate 420 by the corresponding validity of the signatures. The computing hub 404 may determine the levels in the certificate hierarchy at which the certificate was signed. The computing hub may use the level in the certificate hierarchy at which the certificate was signed, the number of levels, the distance between levels, etc. to determine a set of authorizations or the level of authorizations for the device 402. The computing hub 404 may determine that the device certificate 420 associated with the device 402 includes valid identification information using look up tables (LUTs), rules, policies, and the like. In one example, the computing hub 404 may include a list of identifiers for authorized devices. The computing hub 404 may match all or part of the subject of the device certificate 420 with an authorization list to determine whether the device certificate 420 associated with the device 402 includes valid identification information. In another example, the computing hub 404 may access an authentication management service to determine whether the device certificate 420 associated with the device 402 includes valid identification information.

According to one example of the present technology, the computing device 404 may determine that the device certificate 420 associated with the device 402 includes valid identification information and the identification information may be associated with one or more service access policy templates. A service access policy template may generalize a service access policy so the service access policy template works for many entities without having to make a unique copy of the policy for each entity. A service access policy template may use one or more policy variables. A policy variable specifies a placeholder in a policy. When the policy is evaluated, the policy variable may be replaced with values that come from a particular context (i.e., a device). For example, a value may be derived from information provided directly or indirectly by a device, such as in a request sent by the device, in a device's certificate, in environment information, and the like.

Each service access policy template may include a set of policy statements. A policy statement identifies an effect, an action, and a resource. The effect specifies an access level assigned to the action, for example, whether the action will be allowed or denied. The action specifies the action to which the policy statement is directed. Some examples of actions are Message Queuing Telemetry Transport (MQTT) actions (e.g., connect, publish, receive, subscribe, etc.), device state actions (e.g., create, read, update, delete), execution state actions (e.g., create, read, update, delete, start, stop, etc.), and the like. The resource specifies the resource or resources to which the action applies. The following is an example JSON document defining a service access policy template:

```
{
   "Statement": [{
   "Effect": "Allow",
   "Action": ["iot:Publish"],
   "Resource":    ["arn:aws:iot:us-east-1:123456789012:
      thing/${Certificate.CommonName}"]
   },
   {
   "Effect": "Allow",
   "Action": ["iot:Connect"],
   "Resource": ["*"]
   }]
}
```

The computing hub 404 may substitute the identification information obtained from the device certificate 420 with policies variables defined in one or more service access policy templates to determine that the device certificate 420 associated with the device 402 includes valid identification information. Using the service access policy template defined in the above JSON document, the computing hub 404 may substitute the identification information obtained from the device certificate 420 into the policy statement defining an action of "iot:Connect." As the policy statement resource includes a wildcard "*," the computing hub 404 applies the policy statement to the device 402 allowing the device 402 to perform the specified action to connect.

In operation 430, the computing hub 404 may determine device authorizations using the certificate data. The computing hub 404 may include a predefined list of device authorizations applicable to the device 402. For example, using the identification information, the computing hub 404 may match the identification information to corresponding device authorizations in the list. In another example, the computing hub 404 may retrieve a set of authorizations from the authorization service.

According to one example of the present technology, the computing hub 404 may construct a set of authorizations for the device 402 using the service access policy templates. Using the service access policy template (e.g., defined in a JSON document), the computing hub 404 may substitute values obtained from the device certificate 420 into variables defined within the policy statement specifying an action of "iot:Publish." As the policy statement resource includes the substitution variable "S{Certificate.CommonName}," the computing hub 404 applies the common name of the device 402 obtained from the device certificate 420 to the policy statement. The computing hub 404 thereby determines that the set of authorizations for the device 402 includes being allowed to publish to the resource. In operation 432, the computing hub 404 and the device 402 may exchange messages using the determined device authorizations.

According to one example of the present technology, the computing hub 404 may determine that the device certificate 420 associated with the device 402 does not include valid identification information. The set of authorizations the computing hub 404 may set for the device 402 may include one or more initial or default device authorizations. Even though the device 402 and the computing hub 404 may have mutually authenticated to one another, the computing hub 404 may not have enough information at this point to know what services or functions the device 402 is authorized to access. The computing hub 404 may restrict communication between the device 402 and the computing hub 404 until further authorizations can be established. The computing hub 404 may include a default service access policy template that limits the scope of authorized communication between the device 402 and the computing hub 404 to a handshake protocol. During the handshake protocol, the device 402 and the computing hub 404 may exchange one or more messages using the default authorizations in operation 432.

According to one example of the present technology, the device 402 may send additional authentication information to the computing hub 404. The device 402 may receive a request for additional authorization information, in operation 432. The device 402 may reply 434 with authorization information 436. The authorization information 436 may include information that identifies the device 402, an entity or owner associated with the device 402, information stored on the device 402, information entered by a user of the device 402, data captured or observed by the device 402, and/or the like. The authorization information 436 may include information not otherwise found in the device certificate 420. The authorization information 436 may include data sent from the computing hub 404 and processed by the device 402, for example, using data manipulation or cryptography techniques.

In operation 438, the computing hub 404 may analyze the authorization information 436 received from the device 402. For example, the computing hub 404 may analyze the authorization information 436 to determine whether the authorization information 436 is valid. The computing hub 404 may analyze the authorization information 436 to identify whether a set of credentials presented by the device 402 are valid. In one configuration, the computing hub 404 may analyze the authorization information 436 as a response to a challenge request. The computing hub 404 may analyze the authorization information 436 to identify sensor data and forward the sensor data to one or more applications for analysis. The computing hub 404 may analyze the authorization information 436 to determine values to use with one or more service access policy templates.

In operation 440, the computing hub 404 may determine device authorizations using the authorization information 436. For example, using the authorization information 436, the computing hub 404 may match the authorization information 436 to corresponding device authorizations in a list. In another example, the computing hub 404 may retrieve a set of authorizations from the authorization service in response to the authorization information 436. According to one example of the present technology, the computing hub 404 may construct a set of authorizations for the device 402 using the service access policy templates and the authorization information 436. The computing hub 404 may substitute values from the authorization information 436 with one or more substitution variables defined in a service access policy template.

According to the present technology, the computing hub 404 may authenticate the device 402 using the device certificate 420 and determine device authorizations for the device using the device certificate 420 and a set of service access policy templates. The computing hub may determine the device authorizations using device identification information from the device certificate 420 as values to substitute for substitution variables within the set of service access policy templates. The computing hub 404 may enable the device 402 to communicate with the computing hub 404 using a scope of authorized communication enabled. The computing hub may expand the first set of authorizations to a second set of authorizations using the authorization information 436 provided by the device 402 during communicating within the first scope of authorized communication. Accordingly, the computing hub 404 may perform dynamic policy construction (e.g., on-the-fly) using service access policy templates.

While FIG. 4 illustrates the system 400 for out-of-band registration of the device 402 with the computing hub 404, the present technology may also be utilized for out-of-band registration of the device 402 with one or more other devices within the local network. For example, a first device may be a video camera having a facial recognition service. The video camera may request access to a second device, such as a door lock. The video camera may request access to the door lock to unlock the door in response to recognizing the face of an employee near the door with the facial recognition service. The video camera and the door lock may mutually authenticate and determine device authorizations for the video camera using the device certificate 420 and a set of service access policy templates.

According to one embodiment, a first device may receive a certificate from a second device. The second device may request access within a local environment to the first device. The first device may be included in the local environment to provide one or more services. The first device may authenticate the second device by determining whether the certificate authorizes the second device to access the local environment. The first device may determine, using a set of service access policy templates, whether device identification information in the certificate is mapped to a set of authorizations that authorize the second device to communicate within the local environment. The first device may determine a first set of authorizations having a first scope of authorized service access using the device identification information in the certificate and the set of service access policy templates. The first device may authorize the second device with the first set of authorizations to access one or more of the services provided by the first device identified in the set of service access policy templates.

Figure 5:
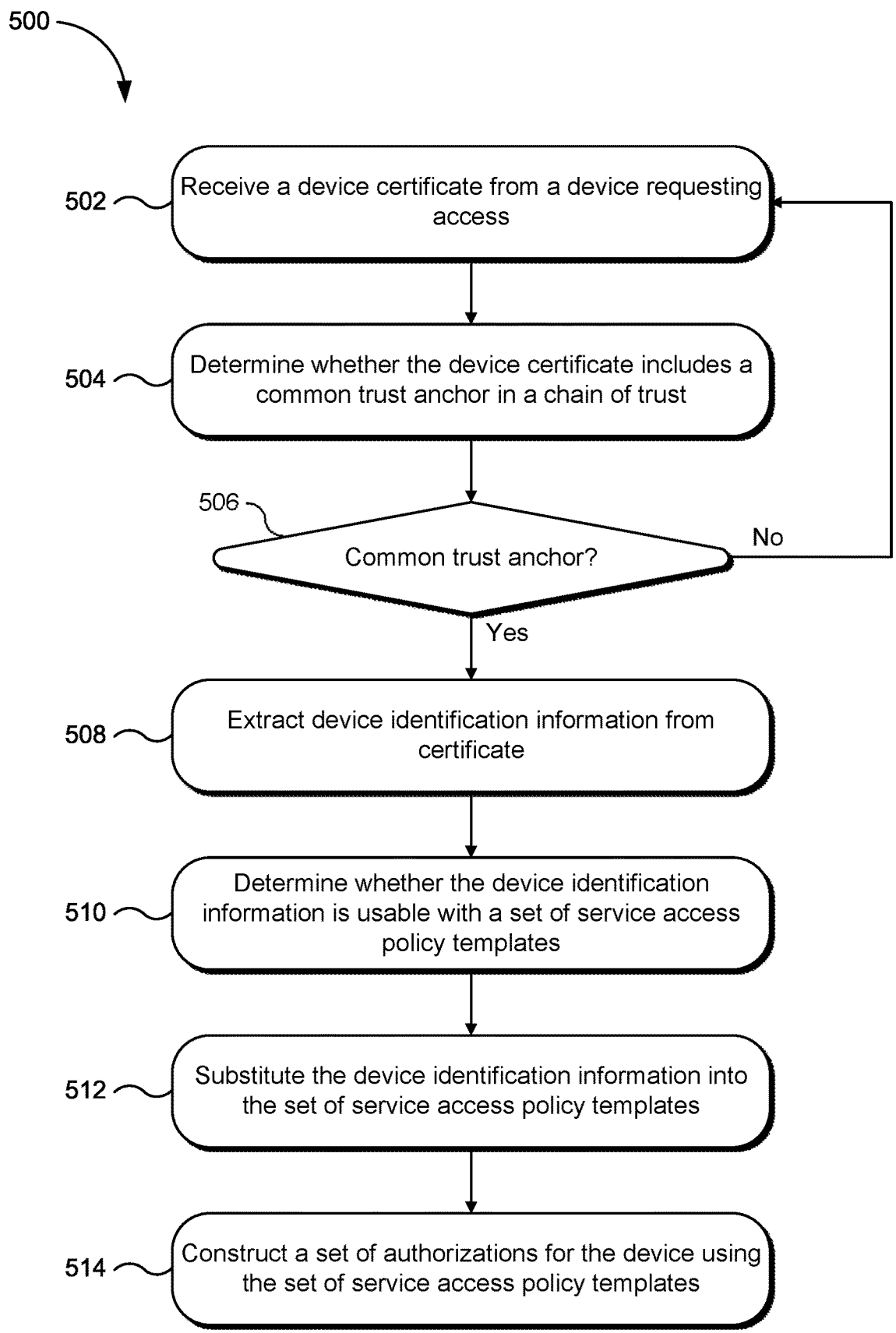
FIG. 5 is a flowchart of a method for constructing device authorizations using service access policy templates and device identification information associated with certificates of authenticated devices registered by a computing hub in a local network according to an example of the present technology.

FIG. 5—Constructing AuthZs using Policy Templates

FIG. 5 is a flowchart of a method 500 for constructing device authorizations using service access policy templates and device identification information associated with certificates of authenticated devices registered by a computing hub in a local network according to an example of the present technology. The method 500 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 500 enables a computing hub to construct a set of authorizations using service access policy templates starting with a device's certificate.

In operation 502, a computing hub receives a device certificate from a device requesting access. The computing hub may receive the device certificate using a secure protocol, such as Transport Layer Security (TLS), Secure Sockets Layer (SSL), and the like. The device may request access to the computing hub. The device may request access to other devices that connect to the computing hub.

In operation 504, the computing hub determines whether the device certificate includes a common trust anchor in a chain of trust. The computing hub may determine that the device certificate is valid when the device certificate has been issued directly or indirectly by a trusted certificate authority. The computing hub may determine that the device certificate includes a chain of trust having a recognized trust anchor. In one example, the computing hub may determine that the device certificate has been issued by a group CA. The group CA may also have issued one or more certificates associated with the computing hub. In another example, the computing hub may determine that the device certificate has been issued directly or indirectly by a root CA. The root CA may have issued one or more certificates to an intermediate CA involved in the issuance of the one or more certificates associated with the device.

When the computing hub determines that the device certificate does not include a common trust anchor in a chain of trust in operation 506, the computing hub may ignore the device and the method 500 may continue operation 502. When the computing hub determines that the device certificate does include a common trust anchor in a chain of trust in operation 506, the computing hub extracts device identification information from the device certificate in operation 508. The computing hub may obtain certificate information from the device certificate. More specifically, the computing hub may extract one or more fields, blocks, or portions from the device certificate to determine device identification information associated with the device. In one example, the computing hub may obtain the subject of the device certificate. The subject may indicate device identification information, such as a serial number, common name, organization name, etc., associated with the device.

In operation 510, the computing hub may determines whether the device identification information is usable with a set of set of service access policy templates. For example, the computing hub may determine that the device identification information is usable with a service access policy template when the service access policy template includes a substitution variable. A substitution variable may be found in a policy statement, such as in a resource access definition. The computing device may determine that the device identification information corresponds to a substitution variable using a static mapping, a data type correspondence, a data schema correspondence, and the like. The computing hub may generate the set of service access policy templates from a collection of service access policy templates. The computing hub may select one or more service access policy templates that include a substitution variable corresponding to the device identification information.

In another example, the computing hub may identify one or more substitution variables in one or more service access policy templates in the set of service access policy templates by a variable name. The variable name for the substitution variables may correspond to a field in a device certificate. For example, a name of a substitution variable may include a Certificate.CommonName, a Certificate.Organization or Certificate.O, a Certificate. OrganizationalUnit or Certificate.OU, a Certificate. City or Certificate. Locality, a Certificate.State or Certificate.County or Certificate.Region, a Certificate.Country, or a Certificate.EmailAddress.

In operation 512, the computing hub substitutes the device identification information into a set of service access policy templates. The value for the substitution variable may correspond to the data in a field in a device certificate. For example, a value for a substitution variable may include the value of a CommonName attribute in the device certificate.

In operation 514, the computing hub may construct a set of authorizations for the device using the set of service access policy templates. The computing hub may determine the set of authorizations resulting from the substitution of the device identification information into the set of service access policy templates. The substitution of the device identification information into the set of service access policy templates may provide a set of completed policy statements applicable to the device that each identify an effect, an action, and a resource.

According to this example of the present technology, the method 500 enables the computing hub to construct the set of authorizations for the device using the device's certificate. The present technology may enable a device to be deployed within a customer's computing environment without needing a prior provisioning of the device from a service provider environment. The present technology may utilize the computing hub and the service access policy templates to provide on the fly policy construction using the device's certificate even when access is unavailable to the service provider environment.

Figure 6:
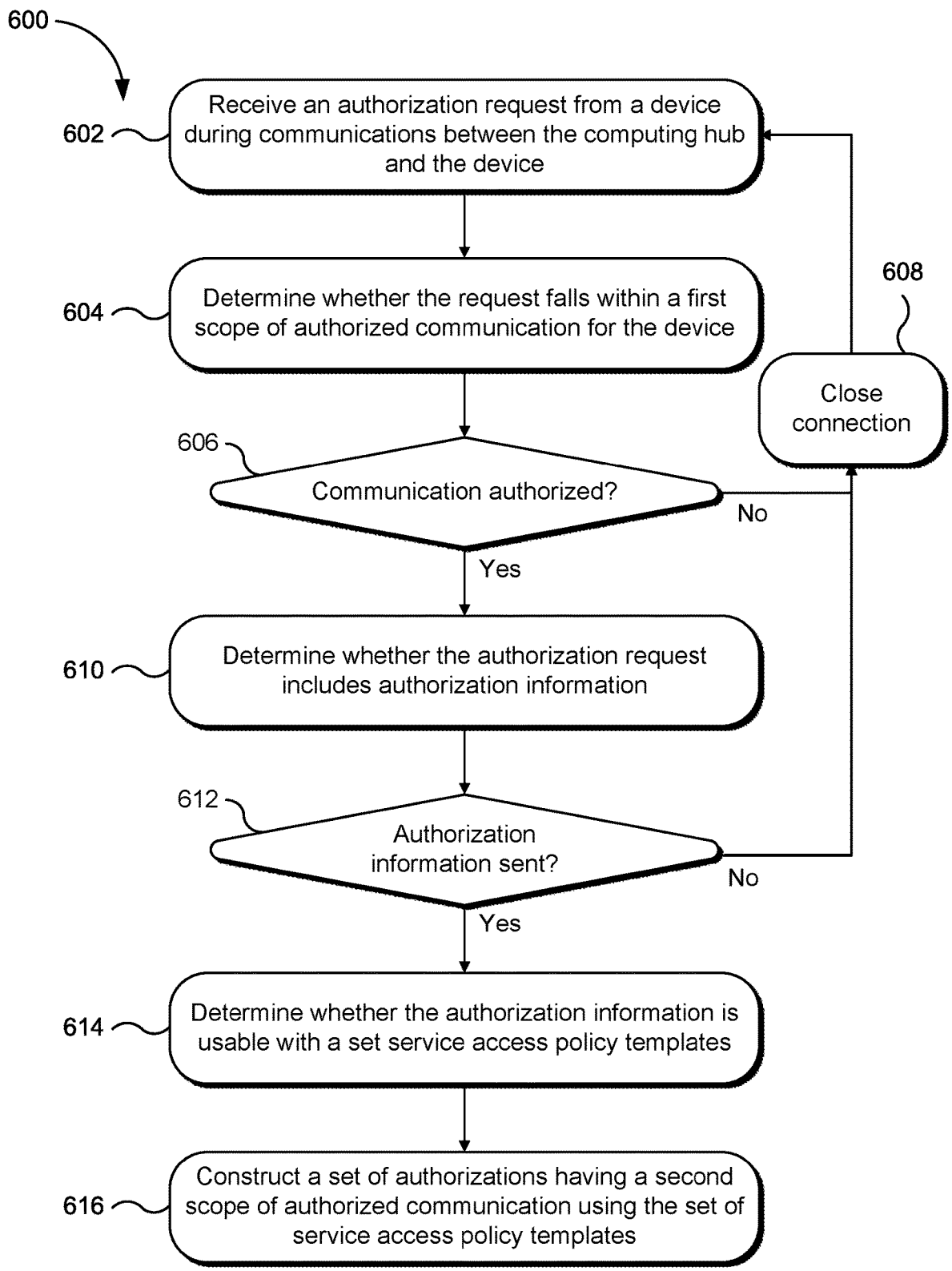
FIG. 6 is a flowchart of a method for negotiating device authorizations between a device and a computing hub in a local network using service access policy templates according to an example of the present technology.

FIG. 6—Negotiating AuthZs using Policy Templates

FIG. 6 is a flowchart of a method 600 for negotiating device authorizations between a device and a computing hub in a local network using service access policy templates according to an example of the present technology. The method 600 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. The method 600 enables the computing hub to construct a set of authorizations for the device using successively permissive exchanges with the device.

In operation 602, the computing hub receives an authorization request from the device during communications between the computing hub and the device. The computing hub may receive the authorization request using a secure protocol, such as Transport Layer Security (TLS), Secure Sockets Layer (SSL), and the like. The device may request authorization to access to the computing hub or access to other services available via the computing hub. The computing hub may receive the authorization request during communications between the computing hub and the device using a first scope of authorized communication. The first scope of authorized communication may limit communication between the computing hub and the device to one or more authorization protocols. In another example, the first scope of authorized communication may enable access by the device to one or more service provided by or through the computing hub.

In operation 604, the computing hub determines whether the authorization request falls within a first scope of authorized communication for the device. The computing hub may analyze the authorization request to determine whether the authorization request is an approved action or resource identified in a set of service access policy templates defining the first scope of authorized communication. The computing hub may analyze the authorization request for the source of the request, the destination of the request, a protocol used to communicate the request, data contained within or accompanying the request, and the like. For example, the computing hub may determine whether the authorization request was received using one of the one or more authorization protocols to which access is limited by the first scope of authorized communication for the device. In another example, the computing hub may determine whether the authorization request was received using a protocol to access the one or more service provided by or through the computing hub.

In one example, the computing hub may determine whether the request falls within the first scope of authorized communication for the device in response to applying the one or more values authorization request to variables within one or more service access policy templates in the set of service access policy templates. The computing hub may extract data from the authorization request or from data accompanying thereto (e.g., in a device certificate) to substitute as values for substitution variables in the set of service access policy templates.

When the computing hub determines that the request does not fall within the first scope of authorized communication for the device in operation 606, the computing hub may ignore the device and the method 600 may continue in operation 608. In operation 608, the computing hub may close a connection to the device. The method 600 may continue in operation 602 awaiting further requests.

When the computing hub determines that the request does fall within the first scope of authorized communication for the device in operation 606, the computing hub may determine whether the request includes authorization information sent using the first scope of authorized communication for the device in operation 610. The authorization information may include information contained within or associated with the authorization request. In one example, the authorization information may include device identification information associated with a device certificate. In another example, the authorization information may include information that identifies the device, an entity or owner associated with the device, information stored on the device, information entered by a user of the device, data captured or observed by the device, and the like. The authorization information may include information not otherwise found in the device certificate. The authorization information may include data sent from the computing hub and processed by the device, for example, using data manipulation or cryptography techniques. When the computing hub determines that the request does not include authorization information sent using the first scope of authorized communication for the device in operation 612, the computing hub may ignore the device and the method 600 may continue in operation 608 where the computing hub may close a connection to the device.

When the computing hub determines that the request does include authorization information sent using the first scope of authorized communication for the device in operation 612, the computing hub may determine whether the authorization information is usable with a set service access policy templates in operation 614. The computing hub may determine a set of service access policy templates that include substitution variables that correspond to the authorization information. The computing device may determine that the authorization information corresponds to a substitution variable using a static mapping, a data type correspondence, a data schema correspondence, and the like. The computing hub may generate the set of service access policy templates from a collection of service access policy templates. The computing hub may select one or more service access policy templates that include a substitution variable corresponding to the authorization information.

In operation 616, the computing hub constructs a set of authorizations having a second scope of authorized communication using the set of service access policy templates. The computing hub may determine the set of authorizations resulting from the substitution of the device identification information into the set of service access policy templates. The substitution of the device identification information into the set of service access policy templates may provide a set of completed policy statements applicable to the device that each identify an effect, an action, and a resource.

The computing hub may replace the authorization information with one or more variables in the set service access policy templates in operation 616. For example, the computing hub may substitute device identification information from a device certificate presented with the authorization request into the set of service access policy templates by replacing one or more device identification variables in a service access policy template. The computing hub may substitute one or more values in the authentication information presented with the authorization request with variables in the set of service access policy templates. The computing hub may identify one or more substitution variables in one or more service access policy templates in the set of service access policy templates. The substitution variable may correspond to a field in device certification, information entered by a user of the device, data captured or observed by the device, and the like. The authorization information may include data sent from the computing hub and processed by the device, for example, using data manipulation or cryptography techniques.

According to one example of the present technology, the second scope of authorized communication may expand the first scope of authorized communication between the computing hub and the device. In one example, the first scope of authorized communication may limit the communication between the computing hub and the device to a certificate exchange. Based on device identification information associated with a device certificate provided during the certificate exchange, the second scope of authorized communication may be enabled. The computing hub may utilize the device identification information to substitute into a set of service access policy templates to construct the set of authorizations that define the second scope of authorized communication that expands the first scope of authorized communication.

According to this example of the present technology, the method 600 enables the computing hub and the device to negotiate the set of authorizations for the device. The method 600 may be repeated to provide successively expanding scopes of authorized communication. The present technology may enable a device to obtain authorization within a local computing environment without needing a prior provisioning of the device from a service provider environment. The present technology may utilize the computing hub and the service access policy templates to provide on the fly policy construction when access is unavailable to the service provider environment.

According to one example of the present technology, the computing hub may provide a device registration service for a local computing environment. The local computing environment may provide a network infrastructure that enables device registration service discovery. For example, a domain name system (DNS) service or a dynamic host configuration protocol (DHCP) service may advertise the device registration service provided by the computing hub. A device may connect to the network infrastructure and receive the address of the computing hub and the associated device registration service. The device then may request access from the computing hub, for example, when access to a service provider environment is unavailable.

The computing hub may provision the device within the local computing environment using a set of service access policy templates. The computing hub may combine service access policy templates with device identification information associated with a device certificate for the device presented during the request for access. The computing hub may determine a set of authorizations for the device and provision the device within the local computing environment with the set of authorizations enabled.

The computing hub may provision the device within the local computing environment with a scope of authorized communication enabled that permits only authentication communication between the computing hub and the device. The computing device may request additional information from the device in order to expand access. The device may submit authentication information to the computing hub in order to enable a second scope of authorized communication, which may permit additional communication between the computing hub and the device.

The present technology enables a customer of the service provider environment to retain control over the local computing environment, for example, when access to the service provider environment is unavailable. The customer may define service access policy templates to generalize a service access policy so the policy works for many devices without having to make a unique copy of the policy for each device.

According to another example of the present technology, the computing hub may provide a device management service for a data center. The data center may provide a network infrastructure that enables device management service discovery. For example, a domain name system (DNS) service or a dynamic host configuration protocol (DHCP) service may advertise the device management service provided by the computing hub. A device may connect to the network infrastructure and receive the address of the computing hub as providing the device management service. The device then may request a configuration from the computing hub.

The computing hub may configure the device within the data center using a set of service access policy templates. The computing hub may combine the service access policy templates with device identification information associated with a device certificate for the device presented during the request for configuration. The computing hub may determine a set of authorizations, a role, a configuration file, etc. for the device and configure the device within the data center with the set of authorizations enabled. This may allow the device to access over the air (OTA) updates from the computing hub, caching, shadowing and any other service provided by the computing hub.

Figure 7:
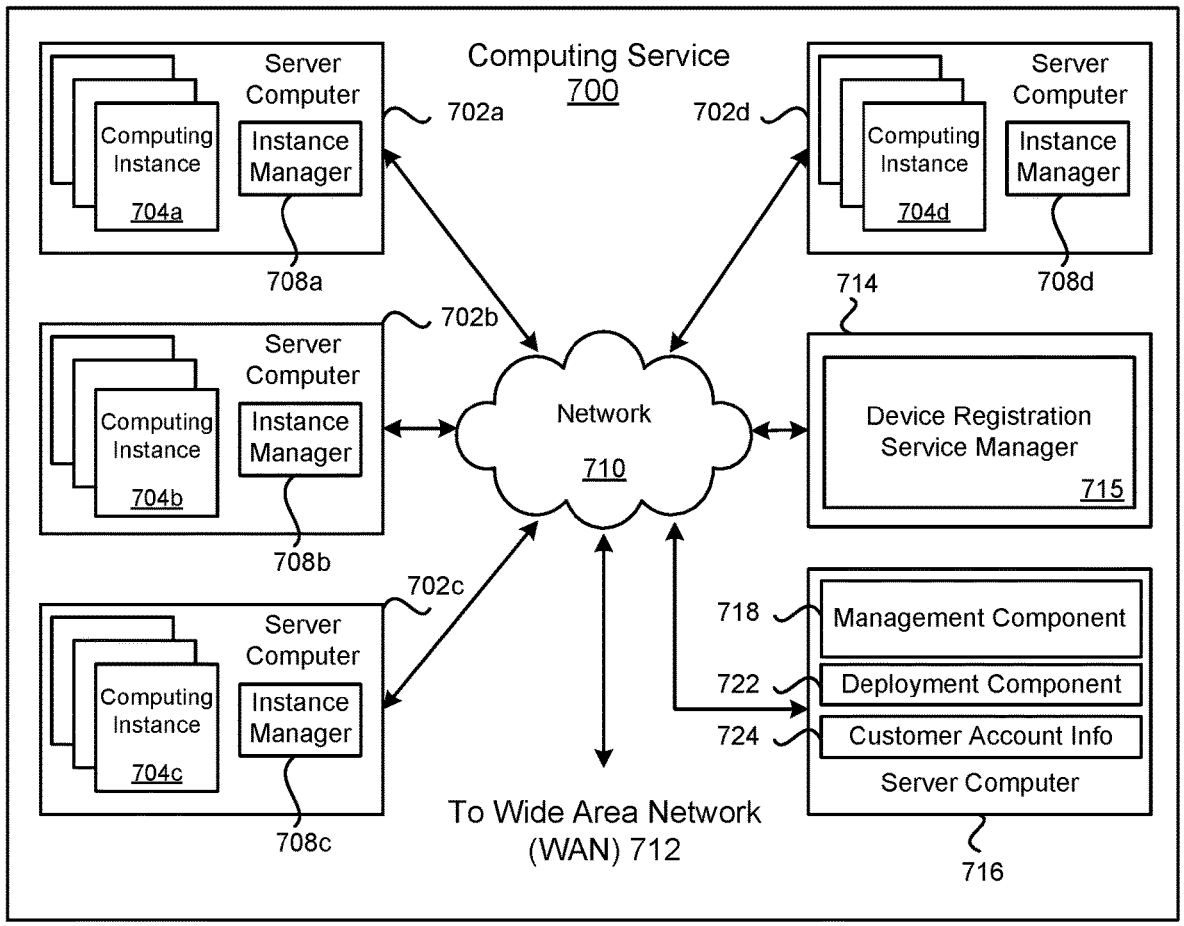
FIG. 7 is a block diagram illustrating an example computing service that may be used to execute and manage a number of computing instances upon which the present technology may execute.

FIG. 7—Example Computing Service

FIG. 7 is a block diagram illustrating an example computing service 700 that may be used to execute and manage a number of computing instances 704a-d upon which the present technology may execute. In particular, the computing service 700 depicted illustrates one environment in which the technology described herein may be used. The computing service 700 may be one type of environment that includes various virtualized service resources that may be used, for instance, to host computing instances 704a-d.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of customers may operate independently (i.e., a public cloud environment). Generally speaking, the computing service 700 may provide the following models: Infrastructure as a Service ("IaaS"), Platform as a Service ("PaaS"), and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 700. End customers may access the computing service 700 using networked client devices, such as desktop computers, laptops, tablets, smartphones, etc. running web browsers or other lightweight client applications, for example. Those familiar with the art will recognize that the computing service 700 may be described as a "cloud" environment.

The particularly illustrated computing service 700 may include a plurality of server computers 702a-d. The server computers 702a-d may also be known as physical hosts. While four server computers are shown, any number may be used, and large data centers may include thousands of server computers. The computing service 700 may provide computing resources for executing computing instances 704a-d. Computing instances 704a-d may, for example, be virtual machines. A virtual machine may be an instance of a software implementation of a machine (i.e. a computer) that executes applications like a physical machine. In the example of a virtual machine, each of the server computers 702a-d may be configured to execute an instance manager 708a-d capable of executing the instances. The instance manager 708a-d may be a hypervisor, virtual machine manager (VMM), or another type of program configured to enable the execution of multiple computing instances 704*a-d* on a single server. Additionally, each of the computing instances 704*a-d* may be configured to execute one or more applications.

A server computer 714 may be reserved to execute software components for implementing the present technology or managing the operation of the computing service 700 and the computing instances 704*a-d*. For example, the server computer 714 may execute a device registration service manager 715 operable to control authentication and authorization of devices. The device registration service manager 715 may utilize a device's certificate to determine authentication and authorization. The device registration service manager 715 may utilize service access policy templates that generalize service access policies for many entities without having to make a unique copy of the policy for each entity. As a result, the device registration service manager 715 may enable offline and out-of-band deployment and provisioning of the devices and on-the-fly policy construction.

A server computer 716 may execute a management component 718. A customer may access the management component 718 to configure various aspects of the operation of the computing instances 704*a-d* purchased by a customer. For example, the customer may setup computing instances 704*a-d* and make changes to the configuration of the computing instances 704*a-d*.

A deployment component 722 may be used to assist customers in the deployment of computing instances 704*a-d*. The deployment component 722 may have access to account information associated with the computing instances 704*a-d*, such as the name of an owner of the account, credit card information, country of the owner, etc. The deployment component 722 may receive a configuration from a customer that includes data describing how computing instances 704*a-d* may be configured. For example, the configuration may include an operating system, provide one or more applications to be installed in computing instances 704*a-d*, provide scripts and/or other types of code to be executed for configuring computing instances 704*a-d*, provide cache logic specifying how an application cache is to be prepared, and other types of information. The deployment component 722 may utilize the customer-provided configuration and cache logic to configure, prime, and launch computing instances 704*a-d*. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702*a-d*, 716. The network 710 may be a local area network (LAN) and may be connected to a Wide Area Network (WAN) 712 or the Internet, so that end customers may access the computing service 700. In addition, the network 710 may include a virtual network overlaid on the physical network to provide communications between the server computers 702*a-d*. The network topology illustrated in FIG. 7 has been simplified, as many more networks and networking devices may be utilized to interconnect the various computing systems disclosed herein.

Figure 8:
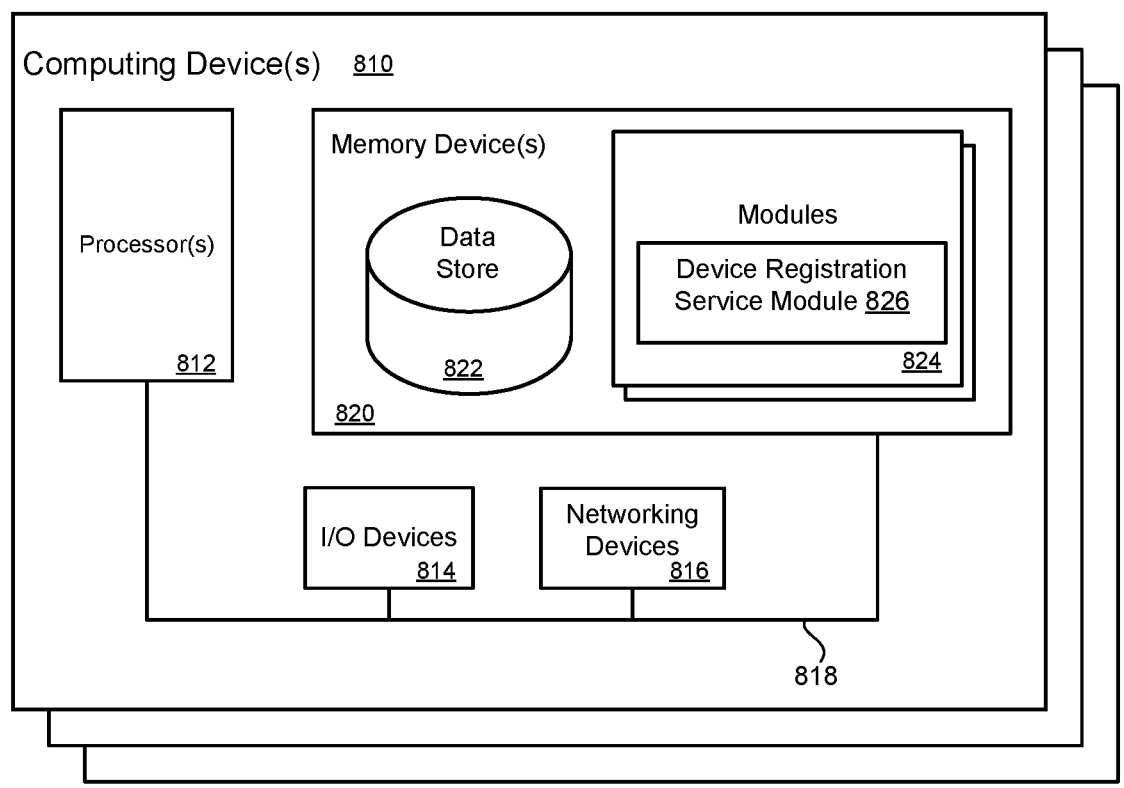
FIG. 8 illustrates one or more computing device(s) on which modules or code components of this technology may execute.

FIG. 8—Example Computing Device

FIG. 8 illustrates one or more computing device(s) 810 on which modules or code components of this technology may execute. A first computing device 810 is illustrated on which a high-level example of the technology may be executed. The first computing device 810 may include one or more processor(s) 812 that are in communication with memory device(s) 820. The computing device may include a local communication interface 818 for the components in the computing device. For example, the local communication interface may be a local data bus and/or any related address or control busses as may be desired.

The memory device(s) 820 may contain modules 824 or code components that are executable by the processor(s) 812 and data for the modules 824. The modules 824 may execute the functions described earlier. In this example, the memory device(s) 820 include a device registration service module 826 operable to control authentication and authorization of devices. The device registration service module 826 may utilize a device's certificate to determine authentication and authorization. The device registration service module 826 may utilize service access policy templates that generalize service access policies for many entities without having to make a unique copy of the policy for each entity. As a result, the device registration service module 826 may enable offline and out-of-band deployment and provisioning of the devices and on-the-fly policy construction.

A data store 822 may also be located in the memory device(s) 820 for storing data related to the modules 824 and other applications along with an operating system that is executable by the processor(s) 812. Other applications may also be stored in the memory device(s) 820 and may be executable by the processor(s) 812. Components or modules discussed in this description that may be implemented in the form of software using high programming level languages that are compiled, interpreted, or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. The networking devices 816 and similar communication devices may be included in the computing device. The networking devices 816 may be wired or wireless networking devices that connect to the internet, a LAN, WAN, or other computing network.

The components or modules that are shown as being stored in the memory device(s) 820 may be executed by the processor(s) 812. The term "executable" may mean a program file that is in a form that may be executed by a processor(s) 812. For example, a program in a higher-level language may be compiled into machine code in a format that may be loaded into a random-access portion of the memory device(s) 820 and executed by the processor(s) 812, or source code may be loaded by another executable program and interpreted to generate instructions in a random access portion of the memory to be executed by a processor. The executable program may be stored in any portion or component of the memory device(s) 820. For example, the memory device(s) 820 may be random access memory (RAM), read only memory (ROM), flash memory, a solid-state drive, memory card, a hard drive, optical disk, floppy disk, magnetic tape, or any other memory components.

The processor(s) 812 may represent multiple processors and the memory 820 may represent multiple memory units that operate in parallel to the processing circuits. This may provide parallel processing channels for the processes and data in the system. The local communication interface 818 may be used as a network to facilitate communication between any of the multiple processors and multiple memories. The local communication interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system, comprising:
   at least one processor; and
   at least one memory device including instructions that, when executed by the at least one processor, cause the system to:
   receive, at a computing hub, a device certificate in response to a request by a device to join a set of connected devices, wherein the computing hub is included in a local network having the set of connected devices which connect to the computing hub to access services provided by the computing hub;
   determine that the device certificate includes a trust anchor in common with a computing hub certificate associated with the computing hub;
   determine that device identification information included in the device certificate is usable with a set of service access policy templates;
   determine service access for the device based at least in part on substituting the device identification information included in the device certificate for a variable in a first service access policy template in the set of service access policy templates; and
authorize the device to access, via the computing hub, one or more services identified in the first service access policy template in the set of service access policy templates.

2. The system as in claim 1 wherein the memory device includes instructions that, when executed by the at least one processor, further cause the system to:
identify the variable of the first service access policy template as corresponding to the device identification information; and
construct a scope of the service access for the device based at least in part on replacing the variable within the first service access policy template with the device identification information.

3. The system as in claim 1 wherein the memory device includes instructions that, when executed by the at least one processor, further cause the system to:
receive, at the computing hub, authorization information during communications between the computing hub and the device using one or more services identified in the first service access policy template;
modify the service access for the device based at least in part on substituting one or more values in the authorization information for a variable in a second service access policy template in the set of service access policy templates; and
authorize the device to access, via the computing hub, one or more services identified in the second service access policy template.

4. The system as in claim 1 wherein the memory device includes instructions that, when executed by the at least one processor, further cause the system to determine that the device certificate includes the trust anchor in common with the computing hub certificate associated with the computing hub based at least in part on verifying that the device certificate has been signed by a group certificate authority or an intermediate certificate authority recognized by the computing hub.

5. A method, comprising:
authenticating, by a computing hub, a device requesting access to a local environment using a certificate received from the device to determine whether the certificate authorizes the device to access the local environment;
determining that a portion of the certificate is usable with a set of service access policy templates in the computing hub;
determining a first set of authorizations having a first scope of authorized communication for the device within the local environment based at least in part on the portion of the certificate used to modify a first service access policy template in the set of service access policy templates; and
authorizing the device to access a resource identified in the first service access policy template.

6. The method of claim 5, further comprising:
determining, by the computing hub, device identification information in the portion of the certificate; and
constructing the first set of authorizations using the set of service access policy templates by substituting the device identification information into a variable defined in the first service access policy template.

7. The method of claim 5, further comprising:
determining, by the computing hub, a number of levels in a chain of trust in the portion of the certificate; and
constructing the first set of authorizations using the set of service access policy templates by substituting the number of levels in the chain of trust into a variable defined in the first service access policy template.

8. The method of claim 5, further comprising:
receiving, by the computing hub, authorization information associated with the device during communications between the computing hub and the device using the first scope of authorized communication;
determining that the authorization information associated with the device is usable with the set of service access policy templates;
determining a second set of authorizations having a second scope of authorized communication within the local environment expanding the first scope of authorized communication based at least in part on the authorization information used to modify a second service access policy template in the set of service access policy templates; and
authorizing, with the second set of authorizations, the device to access a resource identified in the second service access policy template.

9. The method of claim 8, further comprising:
receiving, by the computing hub, additional authorization information associated with the device during communications between the computing hub and the device using the second scope of authorized communication;
constructing a third set of authorizations using the set of service access policy templates based at least in part on the additional authorization information corresponding to a substitution variable of a third service access policy template in the set of service access policy templates; and
wherein the third set of authorizations includes a third scope of authorized communication within the local environment expanding the second scope of authorized communication.

10. The method of claim 5 further comprising:
receiving, using at least the first scope of authorized communication, sensor data captured by the device at the computing hub during communications between the computing hub and the device;
determining that the sensor data is usable with the set of service access policy templates; and
constructing a second set of authorizations using the set of service access policy templates based at least in part on the sensor data corresponding to a substitution variable of a second service access policy template in the set of service access policy templates.

11. The method of claim 10 further comprising:
determining configuration information for the device based at least in part on the sensor data;
configuring the device within the local environment using the configuration information; and
authorizing, with the second set of authorizations, the device to access a resource identified in the second service access policy template.

12. The method of claim 5, wherein authorizing, with the first set of authorizations, the device to access the resource identified in the first service access policy template further comprises authorizing the device to access one or more resources of the computing hub.

13. The method of claim 5, wherein authorizing, with the first set of authorizations, the device to access the resource identified in the first service access policy template further comprises authorizing access by the device with another device within the local environment.

14. The method of claim 5, wherein authorizing, with the first set of authorizations, the device to access the resource identified in the first service access policy template further comprises authorizing the device to access a publish-subscribe network.

15. The method of claim 5, wherein authenticating the device requesting access to the local environment using the certificate associated with the device to determine whether the certificate authorizes the device to access the local environment further comprises verifying that the certificate has been signed by a group certificate authority recognized by the computing hub.

16. The method of claim 5, wherein authenticating the device requesting access to the local environment using the certificate associated with the device to determine whether the certificate authorizes the device to access the local environment further comprises verifying that the certificate has been signed by an intermediate certificate authority recognized by the computing hub.

17. A non-transitory computer-readable medium including instructions that, as a result of execution by one or more processors, cause the one or more processors to perform processing, comprising:
- receiving, at a first device, a certificate from a second device requesting to access within a local environment to the first device, wherein the first device is included in the local environment to provide one or more services;
- authenticating the second device to the first device by determining that the certificate authorizes the second device to access the local environment;
- determining that device identification information in the certificate is mapped to a set of authorizations that authorize the second device to communicate within the local environment with the first device using a set of service access policy templates;
- substituting a device identifier from the device identification information into a device identifier variable in a service access policy template of the set of service access policy templates;
- determining a first set of authorizations having a first scope of authorized service access using the device identification information in the certificate and the set of service access policy templates; and
- authorizing the second device with the first set of authorizations to access one or more of the services provided by the first device identified in the set of service access policy templates.

18. The non-transitory computer-readable medium of claim 17, wherein determining the first set of authorizations includes constructing the first set of authorizations based at least in part on the device identifier in the device identifier variable.

19. The non-transitory computer-readable medium of claim 17, wherein the instructions further cause the one or more processors to perform processing, comprising:
- receiving authorization information associated with the second device during communications between the first device and the second device using the first set of authorizations;
- determining that the authorization information is mapped to a second set of authorizations defined by a second service access policy within the set of service access policy templates; and
- determining the second set of authorizations having a second scope of authorized service access expanding the first scope of authorized service access using the authorization information and the set of service access policy templates.

20. The non-transitory computer-readable medium of claim 17, wherein the instructions cause the one or more processors to further perform processing, comprising:
- receiving, by a computing hub, sensor data during communications between the computing hub and the first device using the first scope of authorized communication; determining that the sensor data generated by the first device is mapped to a set of authorizations defined by the set of service access policy templates; and
- determining a second set of authorizations having a second scope of authorized service access expanding the first scope of authorized communication using the sensor data and the set of service access policy templates.

* * * * *